Feb. 22, 1938. S. H. NEGROTTO 2,108,826
MACHINE GUN CART
Filed Sept. 10, 1935
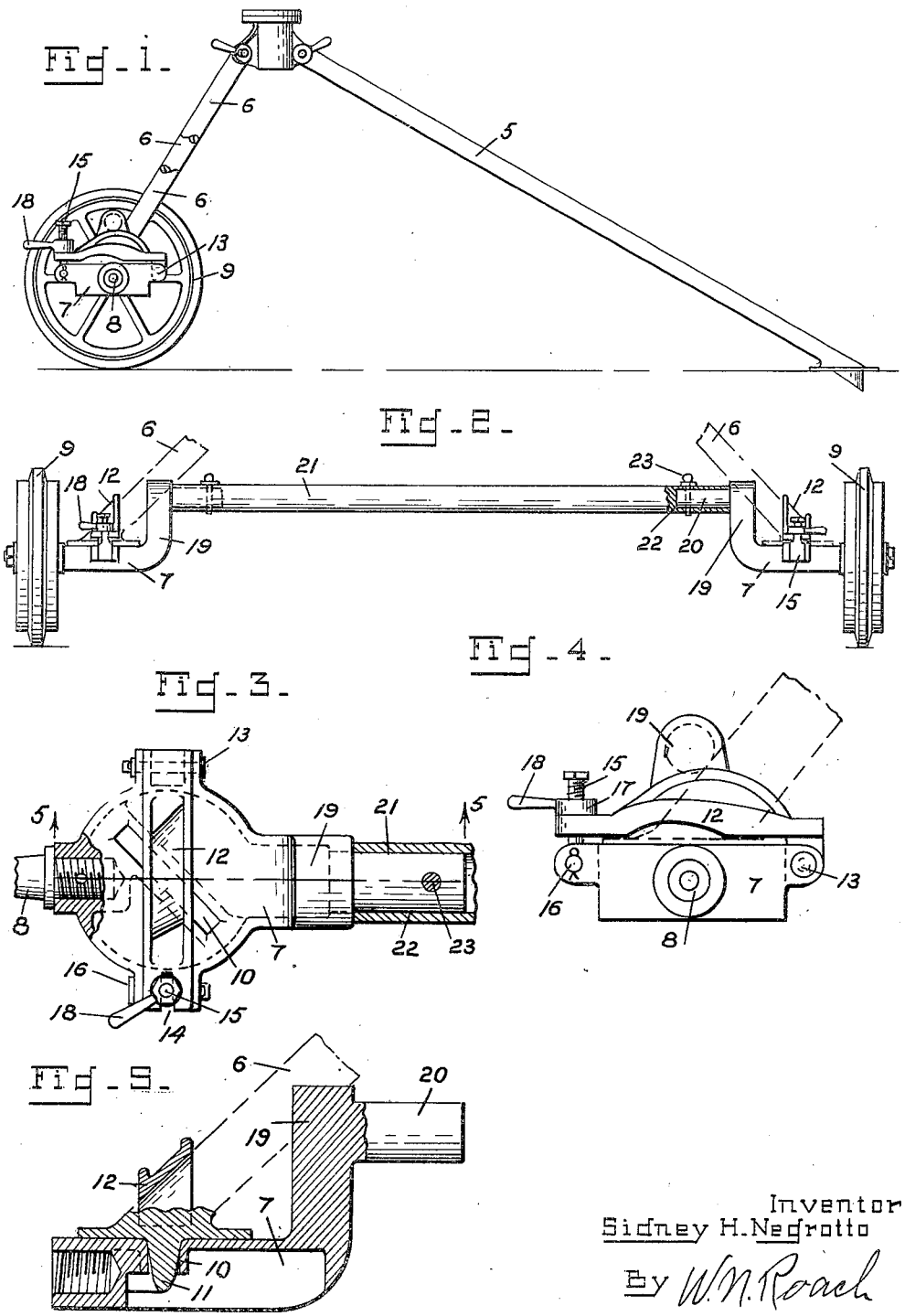
Inventor
Sidney H. Negrotto
By W. N. Roach
Attorney Patented Feb. 22, 1938

2,108,826

UNITED STATES PATENT OFFICE 2,108,826

MACHINE GUN CART

Sidney H. Negrotto, New Orleans, La.

Application September 10, 1935, Serial No. 39,934

1 Claim. (Cl. 89—40)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a machine gun cart.

With a view to transporting a machine gun in the mounted condition ready to open fire the tripod which carries the gun has been secured to the frame of a cart as shown in U. S. Patent No. 1,773,090 of August 19, 1930. When the tripod is employed separate from the cart, the latter is moved by pulling or pushing.

The purpose of this invention is to provide a cart element which is so light that it may be readily picked up and carried when not in use. The reduction in weight of the cart is obtained by having the tripod serve as the frame.

To these and other ends, the invention consists in the construction, arrangement and combination of elements described hereinafter and pointed out in the claim forming a part of this specification.

A practical embodiment of the invention is illustrated in the accompanying drawing, wherein:

Fig. 1 is a view in side elevation of the improved machine gun cart.

Fig. 2 is a view in front elevation with parts in section.

Fig. 3 is a plan view of a stirrup with parts in section.

Fig. 4 is a view in side elevation of the stirrup.

Fig. 5 is a sectional view on the line 5—5 of Fig. 3.

In Fig. 1 there is shown a conventional machine gun tripod which is extended in the accustomed firing position and which consists of a single trail leg 5 and a pair of front legs 6—6.

A pair of similar mobile units which may be easily and quickly associated with the front legs each consists of a stirrup 7 which carries a spindle 8 for a wheel 9. The stirrup is provided with a slot 10 for receiving the cleat 11 on the foot of the front leg. A clamp 12 adapted to engage the front leg is mounted on a pivot pin 13 carried by the stirrup. The free end of the clamp is bifurcated as at 14 to receive a swing bolt 15 mounted on the stirrup through a pivot pin 16. A nut 17 on the bolt is provided with a handle 18 whereby it is rotated and jammed against the free end of the clamp.

Each stirrup is provided with a crank arm 19 having a perpendicularly extending stub shaft 20 on its free end. A bar or tube 21 has socketed ends 22 each of which receives the respective stub shaft 20 of the mobile units. The parts are connected to one another by pins 23. The bar 21 serves as an axle and also as a handle whereby the mobile units may be conveniently picked up and carried or pushed along the ground. The bar is easily and quickly removed to disconnect the mobile units and enable them to be packed for shipping or transported separately.

When the tripod is associated with the mobile units it forms the frame of a cart and draft is transmitted through the trail leg 5. When the trail leg is placed on the ground as shown in Fig. 1 the tripod serves as a gun mount. The tripod is associated with or dissociated from the mobile supports by releasing the clamps and lifting it clear.

I claim:

A tripod having a trail leg and a pair of front legs, each leg having a foot with a cleat, said front legs being divergently extended when the tripod is in normal erected firing position, a mobile unit for each front leg including a wheel and a horizontally disposed stirrup having a slot, the foot of a front leg resting on the stirrup with its cleat inserted in the slot of said stirrup, and a quick-detachable clamp on each horizontally disposed stirrup for holding the foot on the stirrup.

SIDNEY H. NEGROTTO.